United States Patent
Zebley et al.

(10) Patent No.: US 10,410,075 B2
(45) Date of Patent: Sep. 10, 2019

(54) DIFFERENT LEVELS OF ACCESS TO AIRCRAFT BASED ON BIOMETRIC INPUT DATA

(71) Applicant: Honeywell International Inc., Morris Plains, NJ (US)

(72) Inventors: John Zebley, Gilbert, AZ (US); Patricia May Ververs, Ellicott City, MD (US); Kelly L. Boren, Queen Creek, AZ (US); Douglas C. Martens, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/845,982

(22) Filed: Dec. 18, 2017

(65) Prior Publication Data
US 2019/0188508 A1 Jun. 20, 2019

(51) Int. Cl.
| G06K 9/00 | (2006.01) |
| G06K 9/62 | (2006.01) |
| G06F 21/62 | (2013.01) |
| B64D 45/00 | (2006.01) |

(52) U.S. Cl.
CPC ..... *G06K 9/00885* (2013.01); *B64D 45/0015* (2013.01); *G06F 21/6245* (2013.01); *G06K 9/6202* (2013.01)

(58) Field of Classification Search
CPC ............. G06K 9/00885; G06K 9/6202; B64D 45/0015; G06F 21/6245
See application file for complete search history.

(56) References Cited

U.S. PATENT DOCUMENTS

| 6,100,811 A * | 8/2000 | Hsu .................... B60H 1/00642 340/426.36 |
| 6,810,309 B2 | 10/2004 | Sadler et al. |
| 6,923,370 B2 * | 8/2005 | Gotfried ................. B60R 25/00 235/380 |
| 7,024,023 B2 * | 4/2006 | Arnouse ............ B64D 45/0015 340/5.53 |
| 7,084,734 B2 * | 8/2006 | Singh .................. B60R 25/1004 340/5.2 |
| 7,225,976 B1 * | 6/2007 | Moberg .................. B60R 25/25 235/380 |
| 7,406,368 B2 * | 7/2008 | Arnouse ............ B64D 45/0015 244/118.5 |
| 7,783,081 B2 * | 8/2010 | Roques .............. B64D 45/0015 382/115 |

(Continued)

*Primary Examiner* — Brian E Miller
(74) *Attorney, Agent, or Firm* — Shumaker & Sieffert, P.A.

(57) ABSTRACT

In some examples, this disclosure describes a system for verifying identities of a first user and a second user. In some examples, the system includes processing circuitry and a memory device configured to store biometric verification data associated with the first user and the second user. In some examples, the system also includes an input device configured to receive biometric input data and transmit the biometric input data to the processing circuitry. In some examples, the processing circuitry is configured to determine whether the biometric input data matches biometric verification data for the first user or the second user, unlock the aircraft in response to determining that the biometric input data matches biometric verification data for the first user or the second user, and activate the aircraft for operation in response to determining that the biometric input data matches biometric verification data for the first user.

20 Claims, 5 Drawing Sheets

(56) References Cited

U.S. PATENT DOCUMENTS

| | | | |
|---|---|---|---|
| 9,082,237 B2* | 7/2015 | Breed | G06K 9/00369 |
| 9,275,208 B2 | 3/2016 | Protopapas | |
| 9,558,336 B2* | 1/2017 | Lee | A61B 5/681 |
| 9,990,785 B2* | 6/2018 | God | G07C 9/00087 |
| 2003/0204290 A1 | 10/2003 | Sadler et al. | |
| 2004/0164615 A1* | 8/2004 | Alexandropoulos | B60R 25/24 307/10.1 |
| 2010/0321156 A1* | 12/2010 | Pitt | G06F 21/32 340/5.82 |
| 2012/0130563 A1* | 5/2012 | McBain | B64D 45/0015 701/3 |
| 2013/0307670 A1* | 11/2013 | Ramaci | G06F 21/6245 340/5.82 |
| 2014/0002237 A1* | 1/2014 | Infante | B60R 25/252 340/5.32 |
| 2014/0282931 A1 | 9/2014 | Protopapas | |
| 2014/0306814 A1* | 10/2014 | Ricci | H04W 4/21 340/425.5 |
| 2014/0309862 A1* | 10/2014 | Ricci | G01C 21/00 701/36 |
| 2015/0116078 A1* | 4/2015 | Mishra | G07C 9/00007 340/5.51 |
| 2015/0197205 A1* | 7/2015 | Xiong | B60R 16/037 701/49 |
| 2016/0028264 A1* | 1/2016 | Bernhard | H02J 7/345 307/21 |
| 2016/0185358 A1* | 6/2016 | Todasco | B60W 50/12 701/48 |
| 2016/0307380 A1* | 10/2016 | Ho | G07C 9/00079 |
| 2017/0053108 A1* | 2/2017 | Jakobsson | H04L 63/0861 |
| 2017/0057436 A1* | 3/2017 | Dow | B60R 16/037 |
| 2017/0247000 A1* | 8/2017 | Ricci | G06K 9/00302 |

* cited by examiner

DIFFERENT LEVELS OF ACCESS TO AIRCRAFT BASED ON BIOMETRIC INPUT DATA

TECHNICAL FIELD

This disclosure relates to using biometric input data to access an aircraft.

BACKGROUND

A vehicle operator may power on a vehicle using a metal key or a wireless key fob. Some vehicles, such as commercial aircraft, may not even require a key or key fob to power on the vehicle. Instead, the vehicle may require a password before allowing a user to activate the vehicle. When the user powers on the vehicle, an engine, a battery, and/or an auxiliary power source of the vehicle may start operating to generate thrust or propulsion, and the vehicle may activate a user interface.

SUMMARY

This disclosure describes techniques for using biometric input data to provide access to aircraft, including access to aircraft systems. For example, processing circuitry may be configured to unlock an aircraft to a first user or a second user in response to verifying the biometric input data of the first user or the second user. However, the processing circuitry may be configured to activate the aircraft for operation in response to verifying the biometric input data of the first user.

In some examples, a system for verifying identities of a first user and a second user, wherein the system is configured to be mounted on an aircraft, the system including processing circuitry and a memory device configured to store first biometric verification data associated with the first user and second biometric verification data associated with the second user. The system also includes an input device configured to receive biometric input data from the first user or the second user and transmit the biometric input data to the processing circuitry. The processing circuitry is configured to determine whether the biometric input data matches the first biometric verification data, determine whether the biometric input data matches the second biometric verification data, unlock the aircraft in response to determining that the biometric input data matches the first biometric verification data or in response to determining that the biometric input data matches the second biometric verification data, and activate the aircraft for operation in response to determining that the biometric input data matches the first biometric verification data.

In some examples, a method for verifying identities of a first user and a second user, the method including receiving first biometric input data from the first user, receiving second biometric input data from the second user, determining that the first biometric input data matches first biometric verification data associated with the first user, and determining that the second biometric input data matches second biometric verification data associated with the second user. The method also includes unlocking aircraft in response to determining that the first biometric input data matches the first biometric verification data or in response to determining that the second biometric input data matches the second biometric verification data. The method further includes activating the aircraft for operation in response to determining that the first biometric input data matches the first biometric verification data.

In some examples, a device configured to verify identity of a first user and a second user, wherein the device is configured to be mounted on an aircraft, the device including processing circuitry and a user interface configured to allow the first user to operate the aircraft. The processing circuitry is configured to receive biometric input data from the first user or the second user, determine whether the biometric input data matches first biometric verification data associated with a first user, and determine whether the biometric input data matches the second biometric verification data associated with a second user. The processing circuitry is further configured to unlock the aircraft in response to determining that the biometric input data matches the first biometric verification data or in response to determining that the biometric input data matches the second biometric verification data. The processing circuitry is also configured to activate the aircraft for operation in response to determining that the biometric verification data matches the first biometric verification data. The processing circuitry is configured to customize the user interface based on a profile of the first user in response to determining that the biometric input data matches the first biometric verification data.

DETAILED DESCRIPTION

This disclosure is directed to systems, devices, and methods for providing access to aircraft based on biometric input data. A system may provide two or more levels of access to an aircraft, including access to the computer systems of the aircraft, such that the system may be configured to grant access to the aircraft to a first user and a second user, but the system may be configured to activate the aircraft for operation only for the first user. In some examples, each user may have particular access privileges, and the system may be configured to limit what each user can do in the aircraft based on the authorization associated with a user. For example, the system may allow maintenance crew members to access the aircraft but not operate the aircraft (e.g., move or fly the aircraft), but the system may activate the vehicle for operation for an authorized pilot.

In some examples, a fleet of aircraft may be accessed and operated by numerous pilots and other users, such as mechanics, maintenance crew members, cleaners, flight attendants, and pilots. Each user may access and operate a different aircraft during each work period. Some users, such as baggage handler and/or cleaners, may access several aircraft in the fleet during a single work period. A system of this disclosure may be part of a larger security system across the entire fleet that coordinates the level of access to the aircraft in the fleet for each user. The system may be able to verify the identity of different pilot(s) for each flight and different users at each airport without necessarily storing In some examples, the system may be configured to establish two or more classes of users, where each class has a particular level of access. The system may store biometric verification data for each user to a memory device, and the system may associate each user with a class. For example, the processing circuitry of the system may be configured to activate the aircraft for operation for a first class of users that includes authorized operators. The processing circuitry may be configured to unlock a passenger area of the aircraft to a second class of users. As another example, the processing circuitry may be configured to allow a third class of users to access the mechanical components of the aircraft for maintenance.

The system may also be configured to store user data including flight plans, performance tracking, and/or user preferences to a memory device. The performance tracking may include statistics indicating previous operation of the aircraft by the user. The system may be configured to allow a user to access the user data associated with that user in response to determining that the biometric input data matches stored biometric verification data associated with the user.

Figure 1:
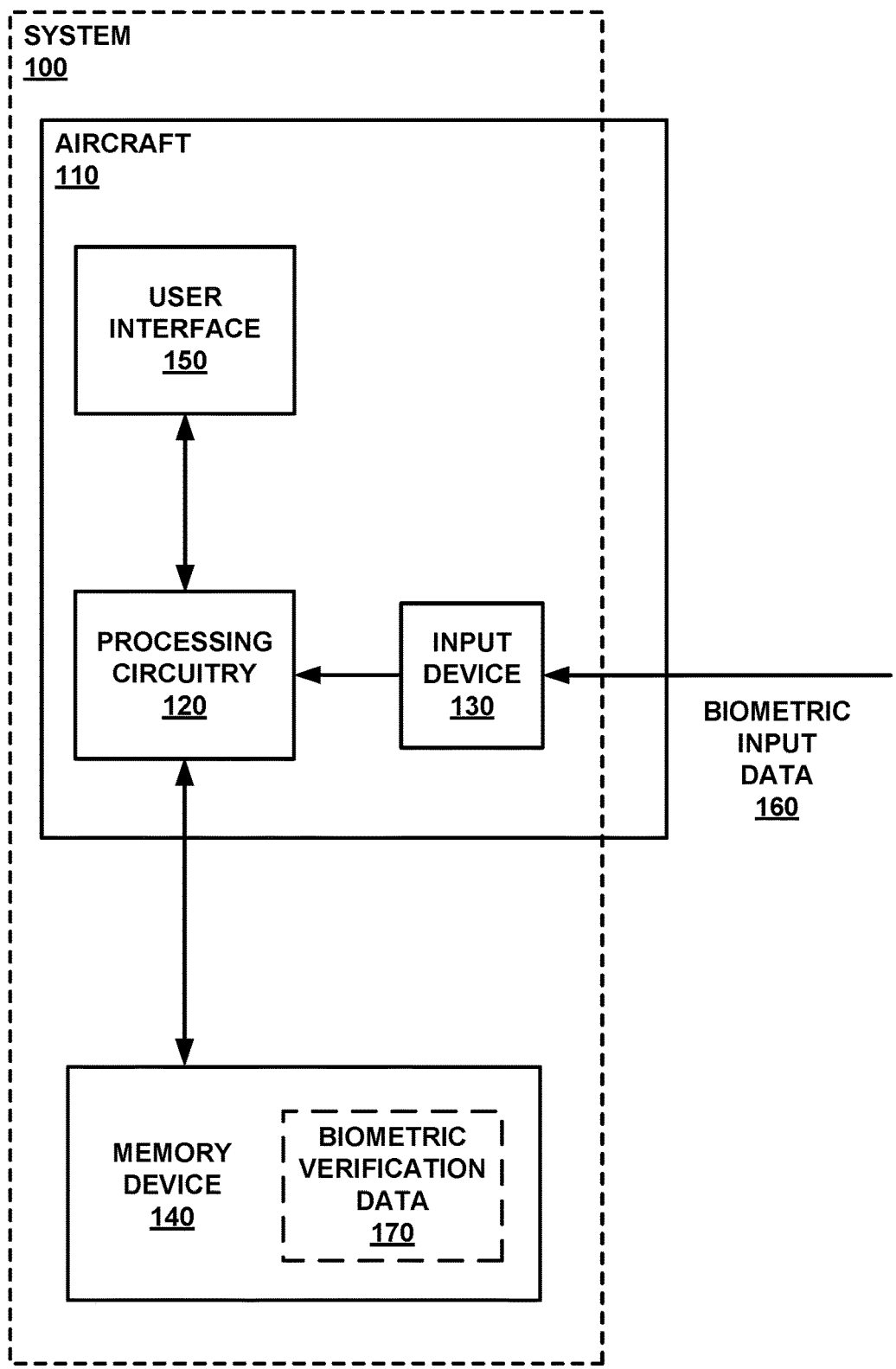
FIG. 1 is a conceptual block diagram depicting a system for verifying biometric input data from users, in accordance with some examples of this disclosure.

FIG. 1 is a conceptual block diagram depicting a system 100 for verifying biometric input data from users, in accordance with some examples of this disclosure. System 100 includes processing circuitry 120, input device 130, memory device 140, and user interface 150. System 100 may also include other components not shown in FIG. 1, such as a locking mechanism to allow or deny access to aircraft 110. System 100 may also include avionics components such as radar, navigation systems, and communication systems.

Figure 2:
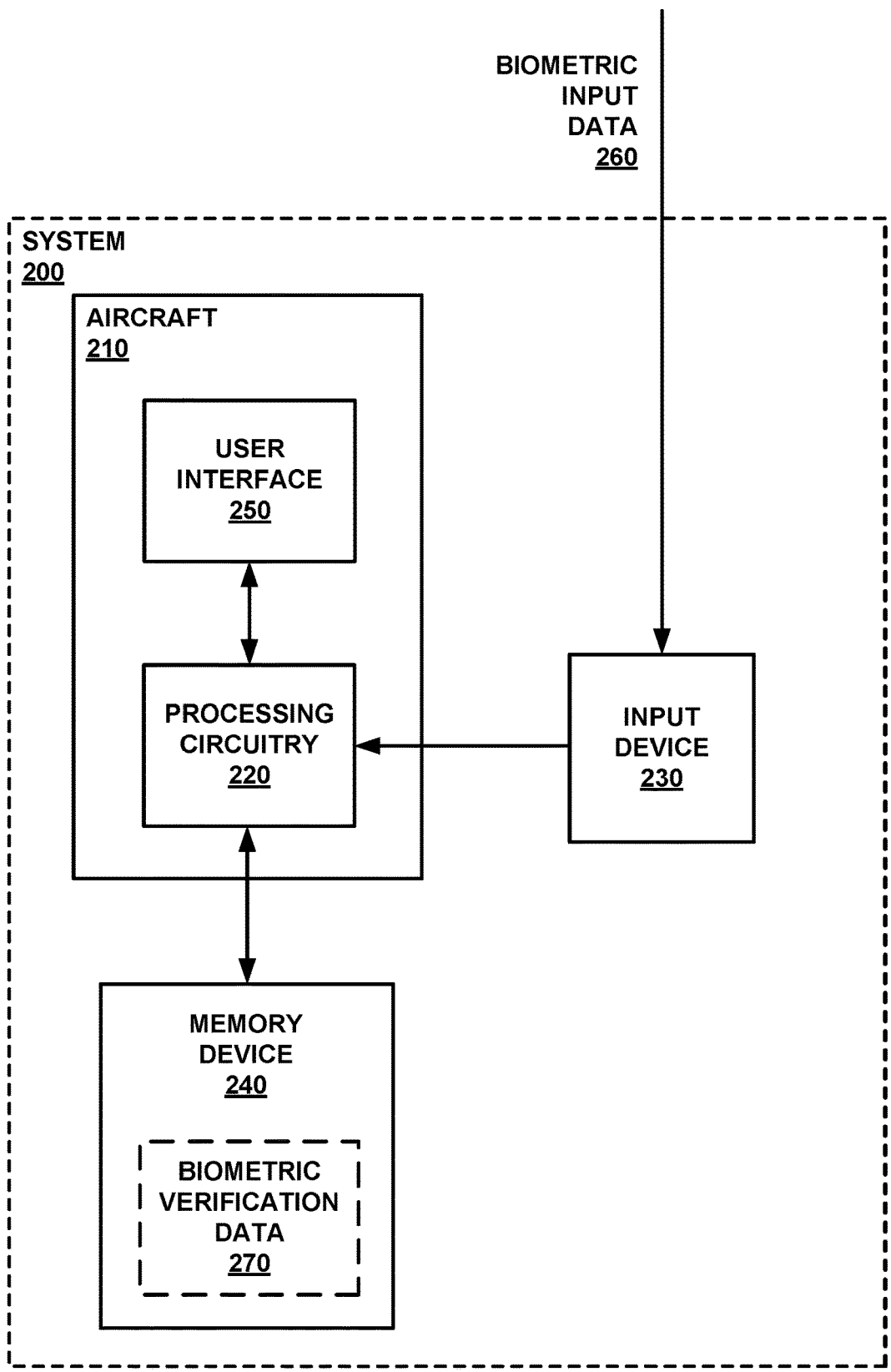
FIG. 2 is a conceptual block diagram depicting a system for receiving biometric input data from a remote input device, in accordance with some examples of this disclosure.

System 100 may be partially or completely onboard aircraft 110. For example, memory device 140 may be located outside of aircraft 110. Memory device 140 may be a remote server and/or database configured to store biometric verification data 170 for a fleet of aircraft that includes aircraft 110. Input device 130 may also be located onboard or outside of aircraft 110. For example, FIG. 2 depicts system 200 including input device 230, which may be a mobile device such as a smartphone, tablet, or laptop computer that can be carried onto and off of aircraft 210.

Aircraft 110 may be a commercial aircraft or military aircraft that is part of a fleet of aircraft. Aircraft may be an airplane, a helicopter, a weather balloon, or any other aerial vehicle. In some examples, system 100 may be mounted on any mobile object or remote object, including land vehicles or marine vehicles including components of system 100. In some examples, system 100 may be mounted on a space vehicle such as a satellite or spaceship. In yet other examples, system 100 may be mounted on a land vehicle such as an automobile or a water vehicle such as a ship or a submarine. System 100 may be mounted on a manned vehicle or an unmanned vehicle, such as a drone, a remote-control vehicle, or any suitable vehicle without any pilot or crew on board. The techniques of this disclosure may be especially applicable to fleets of vehicles, such as commercial aircraft, military aircraft or other vehicles, commercial trucks, transit vehicles, delivery vehicles, and the like.

Processing circuitry 120 is configured to determine whether biometric input data 160 matches biometric verification data 170. In some examples, processing circuitry 120 may determine a "match" between biometric input data 160 and biometric verification data 170 even if there are differences between data 160 and 170. Processing circuitry 120 may be configured to compare biometric input data 160 and biometric verification data 170, determine the differences between data 160 and 170, and determine whether the differences exceed a threshold level. Processing circuitry 120 may use authentication techniques for determining whether data 160 matches data 170. Processing circuitry 120 may use fingerprint analysis techniques, handprint analysis techniques, retina scan analysis techniques, facial recognition, voice recognition, iris patterns, and/or thermal identification techniques.

Processing circuitry 120 is configured to unlock aircraft 110 in response to determining that biometric input data 160 matches biometric verification data 170. Aircraft 110 may include a locking mechanism to allow or prevent access to aircraft 110 by users. For example, the locking mechanism may allow or prevent the use of a door on aircraft 110. Aircraft 110 may be locked until processing circuitry 120 determines a match between data 160 and 170. Processing circuitry 120 may be configured to deliver a control signal to the locking mechanism to lock or unlock aircraft 110.

Processing circuitry 120 is also configured to activate aircraft 110 for operation in response to determining that biometric input data 160 matches biometric verification data 170. Aircraft 110 may include one or more power sources such as engines, batteries, and/or auxiliary power sources for producing energy to move aircraft 110. In some examples, processing circuitry 120 may prevent users from activating the power source(s) until processing circuitry 120 has verified that a user is authorized to operate aircraft 110. For example, processing circuitry 120 may determine that biometric input data 160 matches biometric verification data 170 associated with an authorized operator such as an authorized pilot, driver, or captain.

Input device 130 is configured to receive biometric input data 160 from a user. Biometric input data 160 may include a fingerprint scan, a handprint scan, a retina scan, a facial scan, a thermal identification reading, and/or a two-party biometric reading. A two-party biometric reader may receive biometric input data 160 from two users, such as a pilot and a co-pilot. In some examples, processing circuitry 120 may be configured to unlock the cockpit only in response to receiving biometric input data 160 from both users and determining that data 160 matches data 170.

Input device 130 may also be configured to transmit biometric input data 160 to processing circuitry 120. Input device 130 may transmit data to processing circuitry 120 through a wired connection or a wireless connection. The connection may include an internet connection, a WiFi connection, a Bluetooth connection, and/or an ethernet connection.

Input device 130 may be a dedicated device, such as specialized fingerprint scanner, or a generic device with the capability to receive biometric input data 160, such as smartphone with a fingerprint reader, a retina scanner, an iris scanner, a microphone, or a facial recognition scanner. In some examples, a smartphone may include generic hardware such as a camera for capturing an image of a face or a palm print. The smartphone may include specialized software configured to analyze and match the image or other data to determine if the data matches biometric verification data 170. Input device 130 may be mounted on aircraft 110 or a portable mobile device that a user can carry on and off aircraft 110.

Memory device 140 is configured to store biometric verification data 170 for one or more users. Biometric verification data 170 may include scans or readings of biometric input data from users. In some examples, memory device 140 may be configured to store user data associated with each user. The user data may include travel plans (e.g., flight plans), performance tracking, user preferences, and the like. Performance tracking may include miles, hours, maneuvers such as approach and landings, and other details of operating aircraft 110 and possibly other aircraft in a fleet. For example, memory device 140 may be configured to store details for an aircraft operator, such as the number of flights, the total miles and time flown, the weather conditions during each flight, the maneuvers performed during each flight (e.g., type of approach flown), the departure and arrival locations, and so on. Memory device 140 may be configured to store user data such as data indicating the time flown and distances traveled and maneuvers performed by the pilot of aircraft 110 (e.g., landing), or another aircraft in a connected fleet, when operated by the first user.

Memory device 140 may be located onboard aircraft 110 or at a remote location. For example, memory device 140 may be part of a database that stores biometric verification data 170 that can be accessed by a fleet of aircraft. A fleet of commercial trucks or commercial aircraft may use a database for storing biometric verification data 170 for authorized users. Memory device 140 may be configured to store biometric verification data 170 for one or more classes of users, such as authorized aircraft operators, authorized mechanics and technicians, and other classes of users. Each set or object of biometric verification data 170 may be associated (e.g., linked or connected) with an authorized user. Each set or object of biometric verification data 170 may also be associated with a profile and/or user data for the authorized user.

User interface 150 may be configured to allow a user to operate the aircraft by, for example, activating the power source(s) of aircraft 110, running system checks of aircraft 110, and adjusting the seats in aircraft 110. In some examples, user interface 150 may allow a user to activate batteries to supply power to the flight deck displays of aircraft 110. User interface 150 may also be configured to allow an authorized user to upload flight plans, access performance data, configure/adjust the flight deck, and/or perform system checks. Processing circuitry 120 may be configured to customize user interface 150 based on a profile of the user in response to determining that biometric input data 160 matches biometric verification data 170. Customizing user interface 150 may include display the flight plans or statistics associated with the user. Customizing user interface 150 may also include adjusting aircraft 110 to the user preferences associated with the user, such as presenting a customized display configuration to the user, climate control, seat adjustment, and adjustment of other components of aircraft 110. User interface 150 may also be configured to present information about aircraft 110 and information about a planned route to a user. User interface 150 may include a display, an audio speaker, a keypad, a touchscreen, buttons, lights, and/or pedals.

In accordance with the techniques of this disclosure, processing circuitry 120 may be configured to activate aircraft 110 for operation in response to determining that biometric input data 160 matches biometric verification data 170 associated with a first user. Processing circuitry 120 may be configured to refrain from activating aircraft 110 for operation in response to determining that biometric input data 160 matches biometric verification data 170 associated with a second user. For example, processing circuitry 120 may not allow the second user to activate the power source(s) of aircraft 110. In some examples, processing circuitry 120 may allow the second user to activate the power source(s) of aircraft 110, but processing circuitry 120 may lock aircraft 110 in a parked state for the second user.

The first user may be an aircraft operator who is authorized to drive, fly, or operate aircraft 110, and the second user may be a technician, a maintenance worker, a flight attendant, or a baggage handler. For example, processing circuitry 120 may be configured to allow a technician or maintenance worker to access the machinery of aircraft 110 in response to determining that biometric input data 160 matches biometric verification data 170 for an authorized technician or maintenance worker. Processing circuitry 120 may be configured to unlock the baggage or cargo area of aircraft 110 in response to determining that biometric input data 160 matches biometric verification data 170 associated with an authorized baggage handler. Likewise, processing circuitry 120 may be configured to unlock the passenger area of aircraft 110 in response to determining that biometric input data 160 matches biometric verification data 170 associated with an authorized flight attendant.

Memory device 140 may be configured to store data associated with each authorized user that defines the associated access privileges. The access privileges associated with an authorized user may include what data is available to each authorized user and what areas of aircraft 110 the user can access. The access privileges may also include what functions the user can perform, such as operating aircraft 110, activating the power source(s), accessing the cockpit of aircraft 110, accessing the mechanical areas of aircraft 110 and/or the passenger areas of aircraft 110. For example, processing circuitry 120 may not allow a maintenance worker to access certain areas on aircraft 110 but not the cockpit. Processing circuitry 120 may also not allow the maintenance worker to activate the power source(s) or operate or move aircraft 110.

Memory device 140 may also be configured to store user data such as performance tracking, flight plans, and user preferences. Processing circuitry 120 may be configured to prevent a first user from accessing the user data associated with a second user, except that an administrator may be able to access user data associated with other users. The performance tracking may include flight statistics, marine statistics, or driving statistics such as flight plan, type of approach, runway used, landing point, take-off point, flight tracking (includes distance, hours, altitudes, speeds, turns, maneuvers, fuel burned), weather conditions, power source data or engine data (e.g., temperature, N1/N2 speeds, power setting, fuel burn, oil level), types of vehicles operated, etc. Processing circuitry 120 may be configured to give a user access to the user data and performance tracking associated the user after verifying biometric input data 160 from the user.

FIG. 2 is a conceptual block diagram depicting a system 200 for receiving biometric input data 260 from a remote input device 230, in accordance with some examples of this disclosure. Input device 230 may be located outside aircraft 210 in the example of FIG. 2, but input device 230 may also be a mobile device that a user can carry onboard aircraft 210. A user may submit biometric input data 260 to processing circuitry 220 via input device 230 at a remote location, at a location just outside aircraft 210, and/or at a location inside of aircraft 210. From a remote location, the user may edit flight plans and other user data. From just outside aircraft 210, the user may submit biometric input data 260 to gain access (e.g., unlock an outside door) to aircraft 210. From inside aircraft 210, the user may submit biometric input data 260 to gain access to an operation area (e.g., cockpit, or bridge for a marine vehicle), activate power source(s), and/or operate and move aircraft 210.

In some examples, aircraft 210 may include an entry door that is locked until processing circuitry 220 determines that biometric input data 260 matches biometric verification data 270 that is associated with an authorized user. Aircraft 210 may have several doors, including a door to the passenger area, a door to the baggage area, and a door to the cockpit. In some examples, processing circuitry 220 may unlock the door to the cockpit only after determining that biometric input data 260 matches biometric verification data 270 for a pilot or an authorized technician. Processing circuitry 220 may require biometric scanning (e.g., receipt of biometric input data 260) in order to unlock the door to the passenger area, unlock the door to the cockpit, and/or allow use of an avionics system.

In some examples, an aircraft operator may be able to use input device 230 to receive biometric input data 260 before operating aircraft 210. A pilot may use a smartphone or laptop computer as input device 230 to check in at home or at a hotel before a flight. The pilot may upload or enter flight plans and other data using the input device 230 after processing circuitry 220 has determined that biometric input data 260 matches biometric verification data 270.

Figure 3:
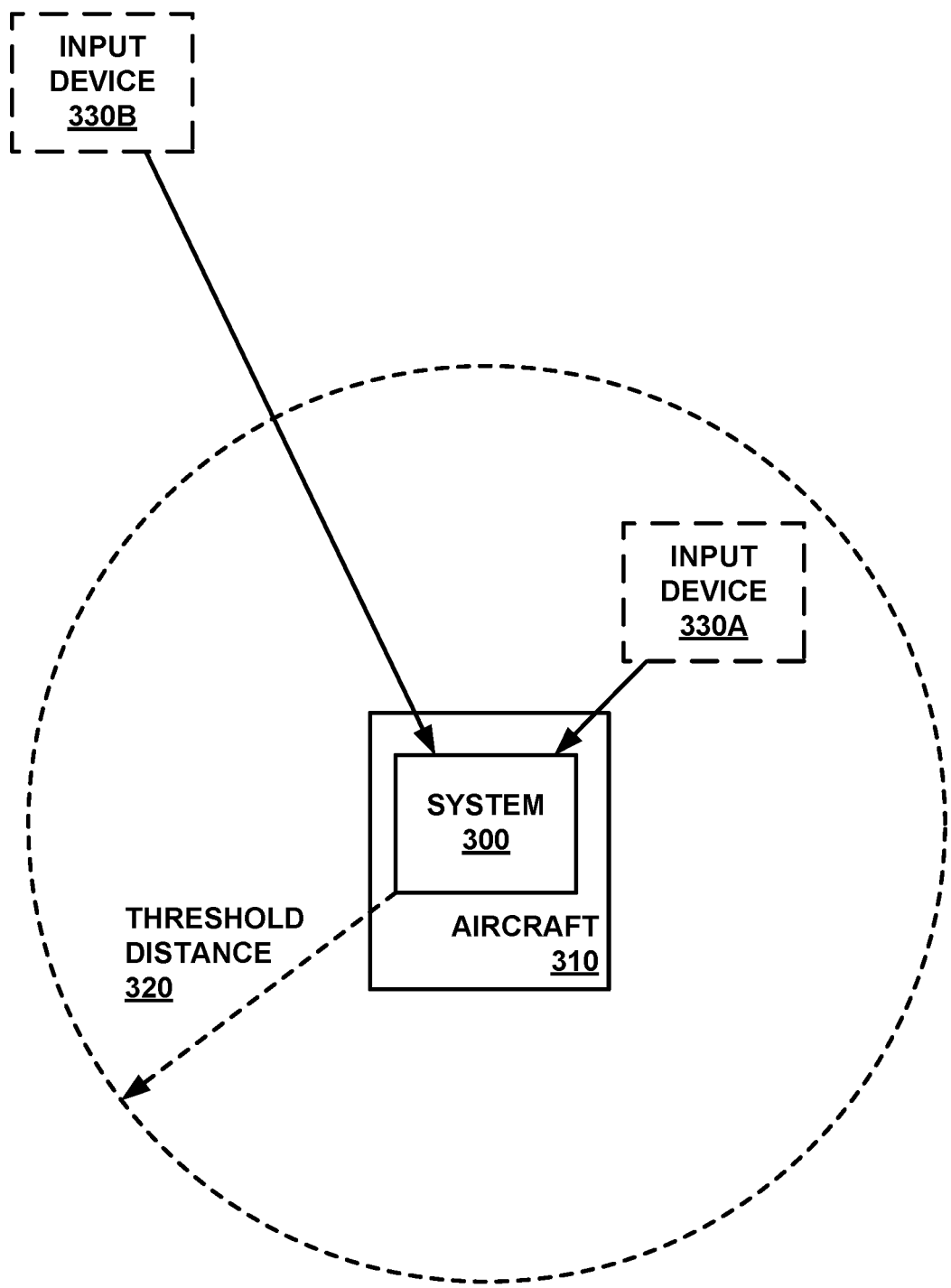
FIG. 3 is a conceptual block diagram depicting a system for receiving biometric input data from an input device at more than one location, in accordance with some examples of this disclosure.

FIG. 3 is a conceptual block diagram depicting a system 300 for receiving biometric input data from an input device at more than one location, in accordance with some examples of this disclosure. Input devices 330A and 330B may be part of portable, mobile devices, such as smartphones, tablets, and/or laptop computers. At a first location that is closer than threshold distance 320 from aircraft 310, input device 330A may receive biometric input data. The data transmission from input device 330A may include data such as the time and location of receipt of the biometric input data. Input device 330A may be configured to transmit the biometric input data to system 300 via an internet connection, a Wifi connection, a Bluetooth connection, a wired connection, and/or any other connection. The processing circuitry of system 300 may be configured to determine that input device 330A received the biometric input data at a location closer than threshold distance 320. The processing circuitry may be configured to activate aircraft 310 in response to determining that input device 330A received the biometric input data at a location closer than threshold distance 320 and in response to determining that the biometric input data matches biometric verification data that is associated with an authorized user.

At a second location that is farther than threshold distance 320 from aircraft 310, input device 330B may receive biometric input data. The processing circuitry of system 300 may be configured to determine that input device 330B received the biometric input data at a location farther than threshold distance 320 based on a data transmission received from input device 330B. Input device 330B may be configured to transmit the biometric input data to the processing circuitry of system 300 via an internet connection. The processing circuitry may be configured to unlock a second level of access to aircraft 310 in response to determining that input device 330B received the biometric input data at a location farther than threshold distance 320 and in response to determining that the biometric input data matches biometric verification data that is associated with an authorized user.

The second level of access may include unlocking an outside door of aircraft 310. In some examples, the second level of access may also include unlocking the cockpit of aircraft 310 or unlocking the bridge of a marine vehicle. Activating aircraft 310 for operation may be part of a first level of access that may only be available to a certain class of users and users that are closer than threshold distance 320 from aircraft 310. In some examples, there may be any number of levels of access, such as three or more levels for entry, maintenance, operation, etc.

The processing circuitry of system 300 may compare the location of an input device to threshold distance 320 in order to avoid a user activating the power source(s) of aircraft 310 from a remote location. In some examples, a user may be able to unlock aircraft 310, or the processing circuitry of system 300 may unlock a door of aircraft 310 only when the user is near aircraft 310. The user may submit biometric input data from home, but system may not unlock the doors of aircraft 310 until the user arrives at aircraft 310. Thus, input device 330A or 330B may operate similar to a key fob.

In some examples, a user may submit biometric input data to a computing system that manages a database for a fleet of aircraft that includes aircraft 330. The database may include a memory device of system 300 that is configured to store biometric verification data for two or more aircraft of the fleet. The user may submit the biometric input data from nearly any location (e.g., onboard aircraft 310 or a remote location). The user may be able to edit user data in the database, which may allow a "connected fleet" of aircraft. The user may enter flight plans from a home computer or any other remote location and then log in at aircraft 310 at the beginning of a trip. System 300 onboard may then access the flight plans that the user uploaded from home, along with other user data and performance statistics.

The database may be part of a cloud computing system that allows a connected fleet and a connected airport. For example, data may flow between nodes such as aircraft and/or airports so that user data may be accessible by processing circuitry onboard the aircraft of a fleet. A central server may store the biometric verification data, user data, performance statistics, and other data. Aircraft in the connected fleet may have access to the data stored in the central server. In some examples, the central server may provide data to aircraft at a single airport or hub or many airports or hubs.

Figure 4:
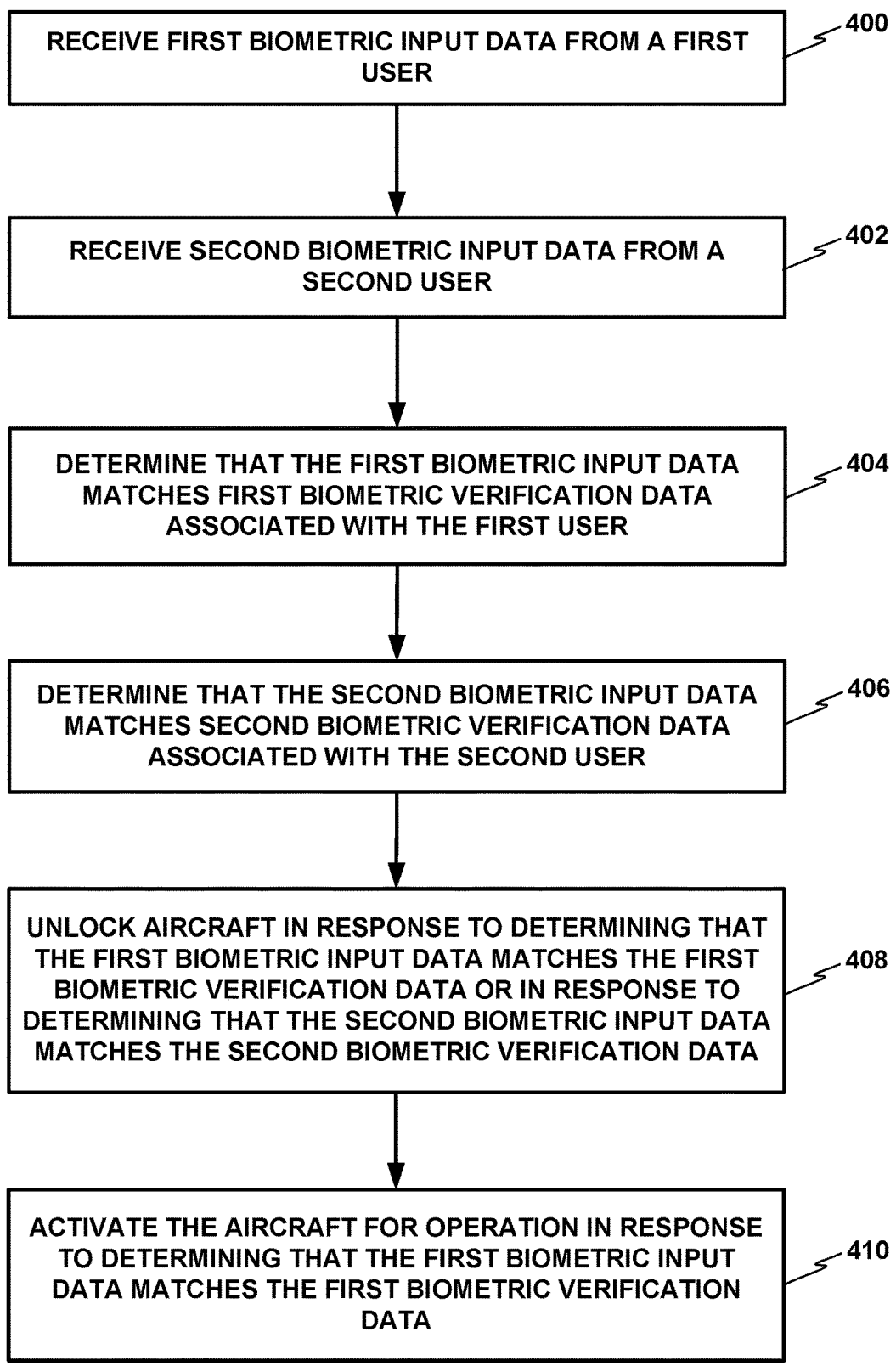
FIG. 4 shows a flowchart for example techniques for verifying biometric input data from users, in accordance with some examples of this disclosure.
Figure 5:
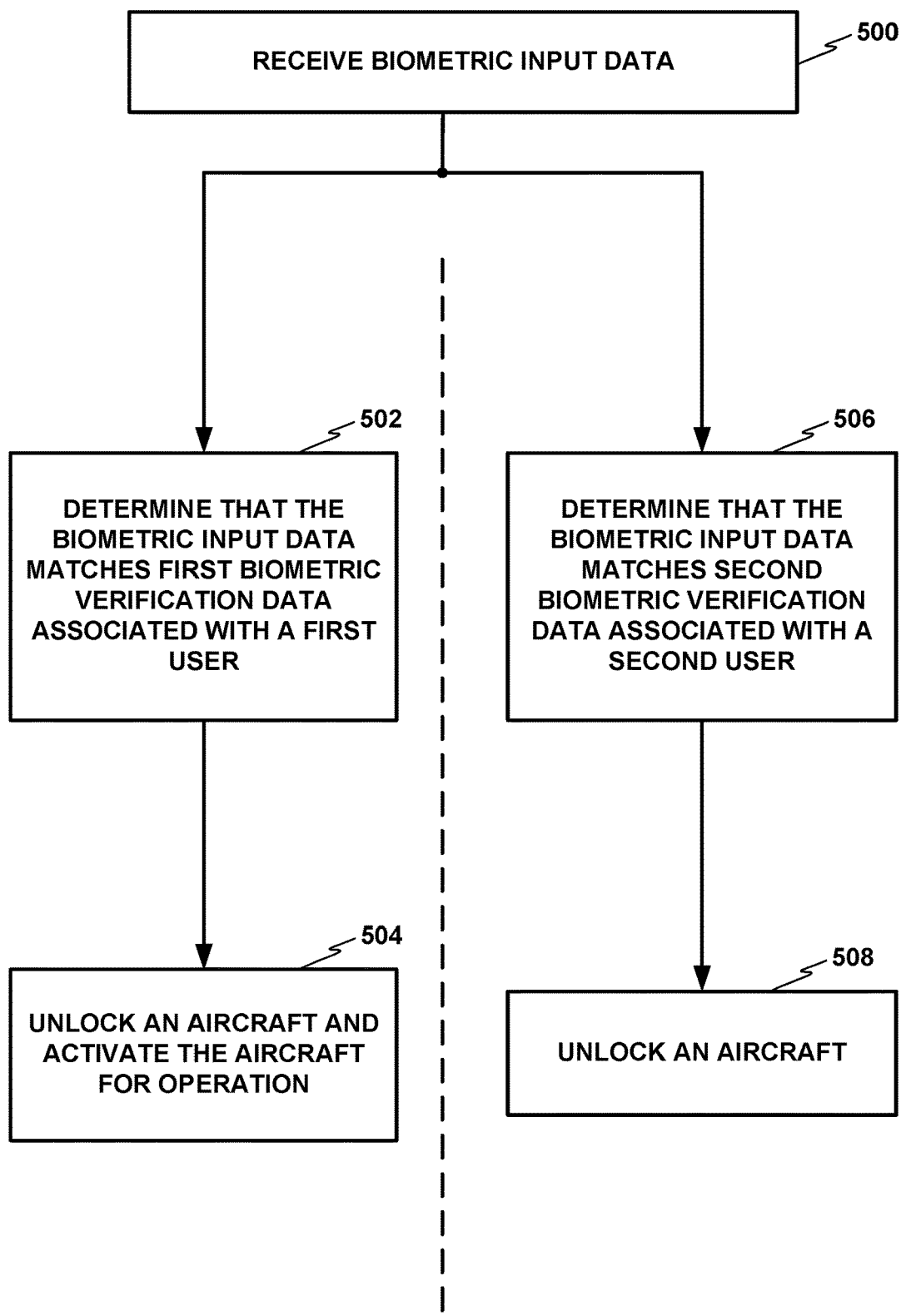
FIG. 5 shows a flowchart for example techniques for providing different levels of access to a first user and to a second user, in accordance with some examples of this disclosure.

FIG. 4 shows a flowchart for example techniques for verifying biometric input data from users, in accordance with some examples of this disclosure. The example techniques of FIGS. 4 and 5 are described with reference to system 100 of FIG. 1, although other components, such as systems 200 and 300 of FIGS. 2 and 3, may perform similar techniques.

In the example of FIG. 4, input device 130 receives biometric input data 160 from a first user (400). Input device 130 also receives biometric input data 160 from a second user (402). Input device 130 may be configured to receive biometric input data 160 through a camera, a scanner (e.g., fingerprint, palm, retina, iris, facial, etc.), a monitor, and/or a thermal identification device.

In the example of FIG. 4, processing circuitry 120 determines, in a first instance, that biometric input data 160 matches biometric verification data 170 associated with the first user (404). Processing circuitry 120 also determines, in a second instance, that biometric input data 160 matches biometric verification data 170 associated with the second user (406). Processing circuitry 120 may use software to analyze the differences between data 160 and 170 to determine a match, which may occur when the differences are less than a threshold level.

In the example of FIG. 4, processing circuitry 120 unlocks aircraft 110 in response to determining that biometric input data 160 matches the first biometric verification data 170 associated with the first user or in response to determining that biometric input data 160 matches biometric verification data 170 associated with the second user (408). Processing circuitry 120 may be configured to unlock an outside door of aircraft 110 to allow the first user or the second user to access a passenger compartment of aircraft 110. Processing circuitry 120 may be further configured to allow the user to access (i.e., provide the user with access to) all or some areas of aircraft 110.

Processing circuitry 120 also activates aircraft 110 for operation in response to determining that biometric input data 160 matches biometric verification data associated with the first user (410). Operation of aircraft 110 may include moving, driving, and/or flying aircraft 110. In some examples, operation of aircraft 110 may also include activating the power source(s) of aircraft 110. Processing circuitry 120 may be configured to request additional biometric input data 160 during operation of aircraft 110 at regular intervals, such as every two hours, in order to verify the identity of the current operator and prevent hijackers from operating aircraft 110.

Memory device 140 may be configured to store access privileges associated with each user or each class of users. For example, one class of users may be cleaning employees with authorization to access to certain areas of aircraft 110. Another class of users may be mechanics with authorization to access to the power source(s), wheel, brakes, and other mechanical components of aircraft 110. A class of users may be aircraft operators with authorization to access to the operation area of aircraft 110, as well as permission to activate power source(s) and move aircraft 110.

FIG. 5 shows a flowchart for example techniques for providing different levels of access to a first user and to a second user, in accordance with some examples of this disclosure. In the example of FIG. 5, input device 130 receives biometric input data 160 (500). In the example of FIG. 5, processing circuitry 120 may determine that biometric input data 160 matches biometric verification data 170 associated with a first user (502). In response to determining that biometric input data 160 matches biometric verification data 170 associated with the first user, processing circuitry 120 unlocks aircraft 110 and activates aircraft 110 for operation (504). In response to determining that biometric input data 160 matches biometric verification data 170 associated with the first user, processing circuitry 120 may also be configured to allow an authorized user to access the systems of aircraft 110 to, for example, upload flight plans, access performance data, configure/adjust the flight deck, and/or perform system checks.

In the example of FIG. 5, processing circuitry 120 may determine that biometric input data 160 matches biometric verification data 170 associated with a second user (506). In response to determining that biometric input data 160 matches biometric verification data 170 associated with the second user, processing circuitry 120 unlocks aircraft 110 (508). Unlocking an outside door of aircraft 110 may be a level of access that is available to more users or more classes of users than operating aircraft 110, which may be restricted to authorized pilots or authorized drivers.

Memory device 140 may be configured to store biometric verification data 170 associated with the profiles of users in a first class of users that includes the first user. The first class of users may be authorized to enter and operate aircraft 110. Processing circuitry 120 may be configured to allow users in the first class a first level of access to aircraft 110, such as access to the cockpit and authority to activate power source(s) and move aircraft 110. The second class of users may be authorized to, for example, perform maintenance on the power source(s) of aircraft 110 or clean aircraft 110. Processing circuitry 120 may be configured to allow users in the second class a second level of access to aircraft 110 that may not include access to the cockpit or the authority to activate power source(s) and move aircraft 110. There may be more classes of users for other specialized users such as passengers, flight attendants, etc. If aircraft 110 is an automobile, a class of users may be authorized to enter and operate the interior controls of aircraft 110 but not drive or move aircraft 110. In some examples, a class of users (e.g., unlicensed operators) may be able to activate power source(s) of aircraft 110 but processing circuitry 120 may prevent these users from driving or moving aircraft 110. Thus, processing circuitry 120 may force aircraft 110 to remain parked.

The techniques of this disclosure may be implemented in a device or article of manufacture including a computer-readable storage medium. The term "processing circuitry" as used herein (e.g., processing circuitry 120 and 220) may refer to any of the foregoing structure or any other structure suitable for processing program code and/or data or otherwise implementing the techniques described herein. Elements of processing circuitry 120 and 220 may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

The systems of FIGS. 1-3 may include one or more memory devices that include any volatile or non-volatile media, such as a RAM, ROM, non-volatile RAM (NVRAM), electrically erasable programmable ROM (EEPROM), flash memory, and the like. The one or more memory devices may store computer readable instructions that, when executed by processing circuitry, cause the processing circuitry to implement the techniques attributed herein to processing circuitry.

Elements of the processing circuitry and/or memory device may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of the processing circuitry and/or memory devices as in any of the examples herein may be implemented as a device, a system, an apparatus, and may embody or implement a method of verifying user identities and providing access to aircraft based on biometric input data.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). The techniques of this disclosure may also apply to uncrewed vehicles. A user may submit biometric input data through an input device in order to operate an uncrewed (i.e., unmanned) vehicle.

The following numbered examples demonstrate one or more aspects of the disclosure.

Example 1

A system for verifying identities of a first user and a second user, wherein the system is configured to be mounted on an aircraft. The system includes processing circuitry and a memory device configured to store first biometric data associated with the first user and second biometric data associated with the second user. The system also includes an input device configured to receive biometric input data from the first user or the second user and transmit the biometric input data to the processing circuitry. The processing circuitry is configured to determine whether the biometric input data matches the first biometric verification data, determine whether the biometric input data matches the second biometric verification data, unlock the aircraft in response to determining that the biometric input data matches the first biometric verification data or in response to determining that the biometric input data matches the second biometric verification data, and activate the aircraft for operation in response to determining that the biometric input data matches the first biometric verification data.

Example 2

The system of example 1, wherein the input device includes a retina scanner, an iris scanner, a fingerprint reader, a handprint reader, a facial recognition device, a voice recognition device, a thermal identification reader, or a two-party biometric reader.

Example 3

The system of examples 1-2 or any combination thereof, wherein the memory device is further configured to store user data including flight plans and performance tracking associated with the first user. The processing circuitry is further configured to allow the first user to access the user data in response to determining that the biometric input data matches the first biometric verification data.

Example 4

The system of examples 1-3 or any combination thereof, wherein the memory device is configured to store user data by at least storing data indicating time flown by the aircraft when operated by the first user and storing data indicating maneuvers performed by the aircraft when operated by the first user.

Example 5

The system of examples 1-4 or any combination thereof, wherein the input device includes a mobile device configured to receive the biometric input data at a location that is farther than a threshold distance from the aircraft. The processing circuitry is further configured to determine that the input device received the biometric input data at the location farther than the threshold distance from the aircraft. The processing circuitry is also configured to unlock a second level of access to the aircraft in response to determining that the input device received the biometric input data at the location farther than the threshold distance from the aircraft, wherein the second level of access does not allow the first user or the second user to operate the aircraft.

Example 6

The system of examples 1-5 or any combination thereof, wherein the input device is configured to receive the biometric input data at a location closer than a threshold distance from the aircraft. The processing circuitry is further configured to determine that the input device received the biometric input data at the location closer than the threshold distance from the aircraft. The processing circuitry is configured to activate the aircraft for operation in response to determining that the biometric input data matches the first biometric verification data and determining that the input device received the biometric input data at the location closer than the threshold distance from the aircraft.

Example 7

The system of examples 1-6 or any combination thereof, wherein the aircraft is a first aircraft, and wherein the memory device includes a database configured to store biometric verification data for two or more aircraft including the aircraft.

Example 8

The system of examples 1-7 or any combination thereof, wherein the memory device is further configured to store biometric verification data associated with profiles of users in a first class including the first user. The memory device is also configured to biometric verification data associated with profiles of users in a second class including the second user. The processing circuitry is further configured to allow users in the first class a first level of access to the aircraft and allow users in the second class a second level of access to the aircraft.

Example 9

A method for verifying identities of a first user and a second user, wherein the method includes receiving first biometric input data from the first user, receiving second biometric input data from the second user, determining that the first biometric input data matches first biometric verification data associated with the first user, and determining that the second biometric input data matches second biometric verification data associated with the second user. The method also includes unlocking aircraft in response to determining that the first biometric input data matches the first biometric verification data or in response to determining that the second biometric input data matches the second biometric verification data. The method further includes activating the aircraft for operation in response to determining that the first biometric input data matches the first biometric verification data.

Example 10

The method of example 9, wherein the first biometric input data and the second biometric input data include, retina scan data, iris scan data, fingerprint data, handprint data, facial recognition data, a voice recognition data, thermal identification data, or two-party data.

Example 11

The method of examples 9-10 or any combination thereof, further including storing user data including flight plans and performance tracking associated with a profile of the first user and allowing the first user to access the user data in response to determining that the first biometric input data matches the first biometric verification data.

Example 12

The method of examples 9-11 or any combination thereof, wherein storing the user data includes storing data indicating time flown by the aircraft when operated by the first user and storing data indicating maneuvers performed by the aircraft when operated by the first user.

Example 13

The method of examples 9-12 or any combination thereof, wherein receiving the first biometric input data includes receiving, at a mobile device at a location that is farther than a threshold distance from the aircraft, the first biometric input data. The method further includes determining that the mobile device received the first biometric input data at the location farther than the threshold distance from the aircraft. The method also includes unlocking a second level of access to the aircraft in response to determining that the mobile device received the first biometric input data at the location farther than the threshold distance from the aircraft, wherein the second level of access does not allow the first user to operate the aircraft.

Example 14

The method of examples 9-13 or any combination thereof, wherein receiving the first biometric input data includes receiving, at a location closer than a threshold distance from the aircraft, the first biometric input data. The method further includes determining that the first biometric input data was received at the location closer than the threshold distance from the aircraft. The method also includes activating the aircraft for operation in response to determining that the first biometric input data matches the first biometric verification data and determining that the input device received the first biometric input data at the location closer than the threshold distance from the aircraft.

Example 15

The method of examples 9-14 or any combination thereof, wherein the aircraft is a first aircraft, wherein the method further includes storing, at a database, biometric verification data for two or more aircraft including the aircraft.

Example 16

The method of examples 9-15 or any combination thereof, further including storing biometric verification data associated with profiles of users in a first class including the first user and storing biometric verification data associated with profiles of users in a second class including the second user. The method also includes allowing users in the first class a first level of access to the aircraft and allowing users in the second class a second level of access to the aircraft.

Example 17

A device configured to verify identity of a first user and a second user, wherein the device is configured to be mounted on an aircraft. The device includes processing circuitry and a user interface configured to allow the first user to operate the aircraft. The processing circuitry is configured to receive biometric input data from the first user or the second user, determine whether the biometric input data matches first biometric verification data associated with a first user, and determine whether the biometric input data matches the second biometric verification data associated with a second user. The processing circuitry is further configured to unlock the aircraft in response to determining that the biometric input data matches the first biometric verification data or in response to determining that the biometric input data matches the second biometric verification data. The processing circuitry is also configured to activate the aircraft for operation in response to determining that the biometric verification data matches the first biometric verification data. The processing circuitry is configured to customize the user interface based on a profile of the first user in response to determining that the biometric input data matches the first biometric verification data.

Example 18

The device of example 17, wherein the processing circuitry is further configured to store, to a memory device, user data including flight plans and performance tracking associated with the first user. The processing circuitry is also configured to allow the first user to access the user data in response to determining that the biometric input data matches the first biometric verification data.

Example 19

The device of examples 17-18 or any combination thereof, wherein the processing circuitry is further configured to determine that the biometric input data was received at a location that is farther than a threshold distance from the aircraft. The processing circuitry is also configured to unlock a second level of access to the aircraft in response to determining that the input device received the biometric input data at the location farther than the threshold distance from the aircraft, wherein the second level of access does not allow the first user or the second user to operate the aircraft.

Example 20

The device of examples 17-19 or any combination thereof, wherein the processing circuitry is further configured to determine that the biometric input data at a location closer than a threshold distance from the aircraft. The processing circuitry is also configured to activate the aircraft for operation in response to determining that the biometric input data matches the first biometric verification data and determining that the input device received the biometric input data at the location closer than the threshold distance from the aircraft.

Various illustrative aspects of the disclosure are described above. These and other aspects are within the scope of the following claims.

What is claimed is:

1. A system for verifying identities of a first user and a second user, wherein the system is configured to be mounted on an aircraft, the system comprising:
   processing circuitry;
   a memory device configured to store:
      first biometric verification data associated with the first user;
      second biometric verification data associated with the second user; and
   an input device configured to:
      receive biometric input data from the first user or the second user; and
      transmit the biometric input data to the processing circuitry;
   wherein the processing circuitry is configured to:
      determine whether the biometric input data matches the first biometric verification data;
      determine whether the biometric input data matches the second biometric verification data;
      unlock the aircraft in response to determining that the biometric input data matches the first biometric verification data or in response to determining that the biometric input data matches the second biometric verification data;
      activate the aircraft for operation in response to determining that the biometric input data matches the first biometric verification data; and
      refrain from activating the aircraft for operation in response to determining that the biometric input data matches the second biometric verification data.

2. The system of claim 1, wherein the input device comprises a retina scanner, an iris scanner, a fingerprint reader, a handprint reader, a facial recognition device, a voice recognition device, a thermal identification reader, or a two-party biometric reader.

3. The system of claim 1,
   wherein the memory device is further configured to store user data including flight plans and performance tracking associated with the first user, and
   wherein the processing circuitry is further configured to allow the first user to access the user data in response to determining that the biometric input data matches the first biometric verification data.

4. The system of claim 3, wherein the memory device is configured to store user data by at least:
   storing data indicating time flown by the aircraft when operated by the first user; and
   storing data indicating maneuvers performed by the aircraft when operated by the first user.

5. The system of claim 1,
   wherein the input device comprises a mobile device configured to receive the biometric input data at a location that is farther than a threshold distance from the aircraft,
   wherein the processing circuitry is further configured to:
      determine that the input device received the biometric input data at the location farther than the threshold distance from the aircraft; and
      unlock a second level of access to the aircraft in response to determining that the input device received the biometric input data at the location farther than the threshold distance from the aircraft, wherein the second level of access does not allow the first user or the second user to operate the aircraft.

6. The system of claim 1,
   wherein the input device is configured to receive the biometric input data at a location closer than a threshold distance from the aircraft,
   wherein the processing circuitry is further configured to determine that the input device received the biometric input data at the location closer than the threshold distance from the aircraft, and
   wherein the processing circuitry is configured to activate the aircraft for operation in response to determining that the biometric input data matches the first biometric verification data and determining that the input device received the biometric input data at the location closer than the threshold distance from the aircraft.

7. The system of claim 1, wherein the aircraft is a first aircraft, and wherein the memory device comprises a database configured to store biometric verification data for two or more aircraft including the aircraft.

8. The system of claim 1,
   wherein the memory device is further configured to store:
      biometric verification data associated with profiles of users in a first class including the first user, and
      biometric verification data associated with profiles of users in a second class including the second user, and
   wherein the processing circuitry is further configured to:
      allow users in the first class a first level of access to the aircraft; and
      allow users in the second class a second level of access to the aircraft.

9. A method for verifying identities of a first user and a second user, the method comprising:
   receiving first biometric input data from the first user;
   receiving second biometric input data from the second user;
   determining that the first biometric input data matches first biometric verification data associated with the first user;
   determining that the second biometric input data matches second biometric verification data associated with the second user;
   unlocking an aircraft in response to determining that the first biometric input data matches the first biometric verification data or in response to determining that the second biometric input data matches the second biometric verification data;
   activating the aircraft for operation in response to determining that the first biometric input data matches the first biometric verification data; and refraining from activating the aircraft for operation in response to determining that the biometric input data matches the second biometric verification data.

10. The method of claim 9, wherein the first biometric input data and the second biometric input data comprise, retina scan data, iris scan data, fingerprint data, handprint data, facial recognition data, voice recognition data, thermal identification data, or two-party data.

11. The method of claim 9, further comprising:
storing user data including flight plans and performance tracking associated with a profile of the first user; and
allowing the first user to access the user data in response to determining that the first biometric input data matches the first biometric verification data.

12. The method of claim 11, wherein storing the user data comprises:
storing data indicating time flown by the aircraft when operated by the first user; and
storing data indicating maneuvers performed by the aircraft when operated by the first user.

13. The method of claim 9,
wherein receiving the first biometric input data comprises receiving, at a mobile device at a location that is farther than a threshold distance from the aircraft, the first biometric input data, and
wherein the method further comprises:
determining that the mobile device received the first biometric input data at the location farther than the threshold distance from the aircraft; and
unlocking a second level of access to the aircraft in response to determining that the mobile device received the first biometric input data at the location farther than the threshold distance from the aircraft, wherein the second level of access does not allow the first user to operate the aircraft.

14. The method of claim 9,
wherein receiving the first biometric input data comprises receiving, at a location closer than a threshold distance from the aircraft, the first biometric input data, and
wherein the method further comprises:
determining that the first biometric input data was received at the location closer than the threshold distance from the aircraft; and
activating the aircraft for operation in response to determining that the first biometric input data matches the first biometric verification data and determining that the input device received the first biometric input data at the location closer than the threshold distance from the aircraft.

15. The method of claim 9, wherein the aircraft is a first aircraft, wherein the method further comprises storing, at a database, biometric verification data for two or more aircraft including the aircraft.

16. The method of claim 9, further comprising:
storing biometric verification data associated with profiles of users in a first class including the first user;
storing biometric verification data associated with profiles of users in a second class including the second user;
allowing users in the first class a first level of access to the aircraft; and
allowing users in the second class a second level of access to the aircraft.

17. A device configured to verify identity of a first user and a second user, wherein the device is configured to be mounted on an aircraft, the device comprising:
processing circuitry; and
a user interface configured to allow the first user to operate the aircraft,
wherein the processing circuitry is configured to:
receive biometric input data from the first user or the second user;
determine whether the biometric input data matches first biometric verification data associated with a first user;
determine whether the biometric input data matches the second biometric verification data associated with a second user;
unlock the aircraft in response to determining that the biometric input data matches the first biometric verification data or in response to determining that the biometric input data matches the second biometric verification data;
activate the aircraft for operation in response to determining that the biometric verification data matches the first biometric verification data;
refrain from activating the aircraft for operation in response to determining that the biometric input data matches the second biometric verification data; and
customize the user interface based on a profile of the first user in response to determining that the biometric input data matches the first biometric verification data.

18. The device of claim 17, wherein the processing circuitry is further configured to:
store, to a memory device, user data including flight plans and performance tracking associated with the first user; and
allow the first user to access the user data in response to determining that the biometric input data matches the first biometric verification data.

19. The device of claim 17, wherein the processing circuitry is further configured to:
determine that the biometric input data was received at a location that is farther than a threshold distance from the aircraft; and
unlock a second level of access to the aircraft in response to determining that the biometric input data was received at the location farther than the threshold distance from the aircraft, wherein the second level of access does not allow the first user or the second user to operate the aircraft.

20. The device of claim 17, wherein the processing circuitry is further configured to:
determine that the biometric input data was received at a location closer than a threshold distance from the aircraft; and
activate the aircraft for operation in response to determining that the biometric input data matches the first biometric verification data and determining that the biometric input data was received at the location closer than the threshold distance from the aircraft.

* * * * *